Oct. 15, 1929.  E. P. RENAUX  1,731,753
VEHICLE BRAKE
Filed Jan. 14, 1927
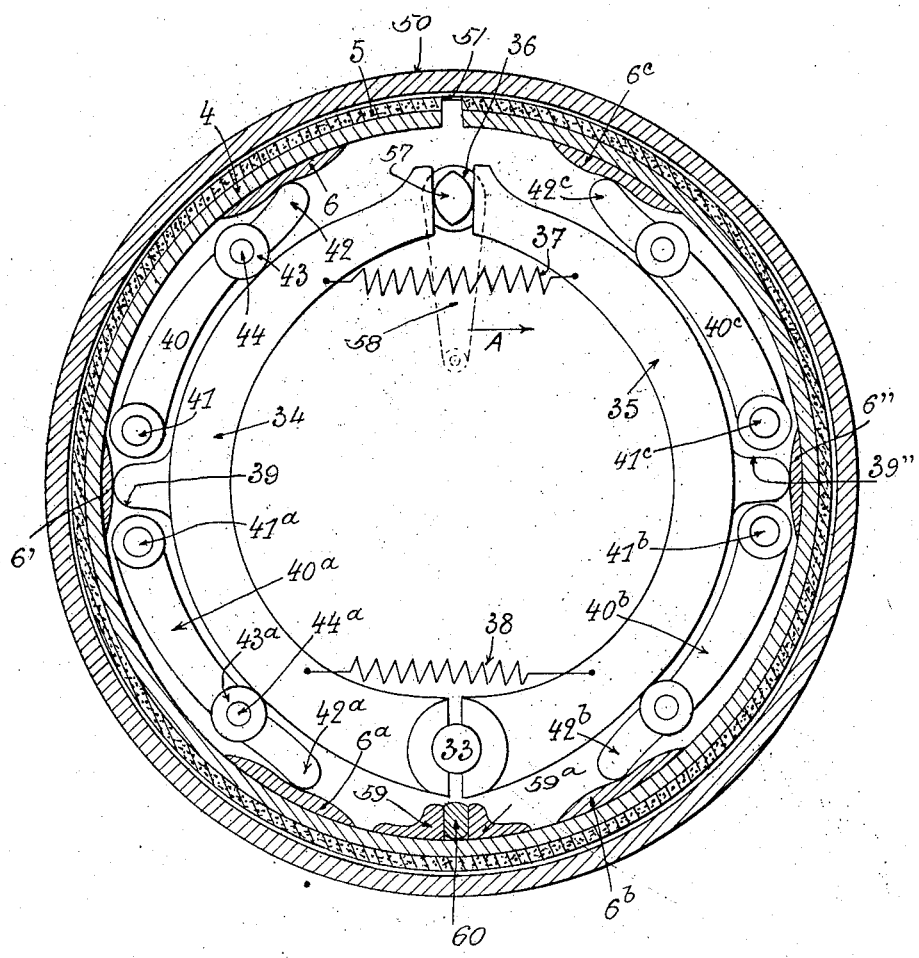
E. P. Renaux
INVENTOR
By Marks & Clark
ATTYS Patented Oct. 15, 1929

1,731,753

UNITED STATES PATENT OFFICE

EUGÈNE PROSPER RENAUX, OF PARIS, FRANCE

VEHICLE BRAKE

Application filed January 14, 1927, Serial No. 161,177, and in Belgium January 29, 1926.

The invention relates to internal expanding brakes with concentric expansion of the braking member or members, in which several points of the braking member or members, equally spaced along the circumference of the brake drum, are moved radially through the same distance, under the control of a common actuating system.

The invention has chiefly for its object to provide a brake of the above type, which is of a simple and reliable construction and may be readily manufactured and mounted.

For this purpose, the brake forming the object of the invention comprises two levers or false shoes pivoted at one end to each other, and spread apart by a cam or like member, portions of the braking means coacting with the free ends of compensating levers pivoted at their other end to suitable fixed pivots, said levers being provided at a suitable point of their length with rollers or like members coacting with the said levers or false shoes and so disposed as to obtain radial displacements of equal amplitude for each free end of said levers.

Preferably, the said levers or false shoes are formed with projections coacting with corresponding portions of the braking means at points situated at the ends of the diameter which is at right angle to the diameter passing through the pivoting connection of said levers or false shoes.

The appended diagrammatic drawing is a transverse section of a brake, taken adjacent the end wall of the brake drum and showing the brake band operating mechanism in side elevation.

Referring to the drawing, 4 denotes the brake band which tends to be rotated by frictional engagement with the brake drum and is stopped by an anchor 60 which is radially slidable in a slot provided in a stopping member 59, 59ᵃ which is riveted or otherwise secured to the band 4. Two levers 34, 35, preferably two shoe shaped members, are pivoted to a stationary pivot 33 and may be spread apart by a cam or like means mounted on the spindle 57, the latter being actuated by the lever 58. The false shoes 34, 35, engage at 39' and 39" the rigid portions 6' and 6" which are riveted or otherwise secured to the brake band 4 at diametrically opposite points. To obtain equal radial displacements at the other points 6, 6ᵃ, 6ᵇ, 6ᶜ, I provide a set of compensating levers such as 40, 40ᵃ, etc., which are pivoted respectively at 41, 41ᵃ on fixed pins, and whose respective ends 42, 42ᵃ engage rigid members 6, 6ᵃ secured to the brake band; said levers are provided intermediate their ends with rollers 43, 43ᵃ engaging the respective false shoes 34, 35. Since the points 39', 39" of said false shoes assume the maximum displacement for a given expansion of the shoes, the rollers 43 can be readily disposed in such manner that the motion of the ends 42 of the levers 40 will be amplified at will whereby the radial displacements of the band will be exactly the same at 6, 6ᵃ, 6ᵇ, 6ᶜ, as at 6' and 6". It should be noted that the levers 40—40ᵃ may be mounted on the same spindle, and that the abutment 7 may be placed at any point on the periphery so as to alter the winding effect; the false shoes 34—35 may be mounted on two separate pivots; the braking pressure may obviously be applied at more or less than six points on the periphery, by the use of the proper number of levers.

Having now described my invention, what I claim as new and desire to secure by Letters Patent is:

1. In a brake, the combination of braking means, brake applying means engaging circumferentially equally spaced portions of the braking means and adapted to secure a uniform pressure on the whole surface thereof and means for controlling said brake applying means.

2. A brake comprising a brake drum, internal expanding braking means, two shoe-shaped members within said brake drum, means for forcing apart said shoe-shaped members and pressure transmitting means cooperating with said shoe-shaped members and said braking means for expanding the latter substantially concentrically with the brake drum.

3. A brake comprising a brake drum, internal expanding braking means, two shoe-shaped members within said brake drum, means for forcing apart said shoe-shaped members and pressure transmitting means cooperating with said shoe-shaped members and said braking means for applying the latter upon the brake drum with a substantially uniform pressure.

4. A brake comprising a brake drum, internal expanding braking means, two shoe-shaped members within said brake drum, means for forcing apart said shoe-shaped members and pressure transmitting means cooperating with said shoe-shaped members and said braking means for moving equally spaced portions of said braking means toward the brake drum through substantially equal radial distances.

5. A brake comprising a brake drum, internal expanding braking means, two pivotal members within said brake drum, means for forcing apart said pivotal members, compensating members pivoted to stationary parts of the brake drum for engaging spaced parts of said braking means and means on said compensating members for engaging said pivotal members.

6. In a brake as claimed in claim 5, means on said pivotal members for engaging said braking means.

7. A brake comprising a brake drum, internal expanding braking means, two shoe-shaped members pivoted to a stationary part of the brake drum, a cam member adapted to force apart said shoe-shaped members, compensating levers pivoted at one end to stationary parts of the brake drum about geometrical axes situated adjacent the ends of the diameter which is at right angle to the diameter intersecting said cam member, the other ends of said levers engaging spaced parts of said braking means, means on said compensating levers intermediate their ends for engaging said shoe-shaped members, and means on said shoe shaped members for engaging said braking means adjacent said geometrical axes.

8. In a brake as claimed in claim 5, rigid members circumferentially spaced along said braking means and whose internal surfaces are adapted to cooperate with said compensating members.

9. A brake comprising a brake drum, an internal elastic braking band, two shoe-shaped members within said brake drum, means for forcing apart said shoe-shaped members, pressure transmitting means cooperating with said shoe-shaped members and said elastic band for expanding the latter substantially concentrically with the brake drum and means for anchoring said braking band at a point intermediate its ends.

In testimony whereof I have signed my name to this specification.

EUGÈNE PROSPER RENAUX.